United States Patent [19]

Moran, Jr.

[11] 4,159,976

[45] Jul. 3, 1979

[54] CURABLE SYSTEMS CONTAINING EPOXY RESIN AND METHANOL OR ETHANOL SOLVENT TO SUPPRESS THE CATALYTIC REACTION BETWEEN EPOXY RESIN AND AN IMIDAZOLE CATALYTIC CURING AGENT

[75] Inventor: James P. Moran, Jr., Waterbury, Conn.

[73] Assignee: Loctite Corporation, Newington, Conn.

[21] Appl. No.: 776,142

[22] Filed: Mar. 10, 1977

[51] Int. Cl.$^2$ ............... C08G 59/00; C08G 59/18; C08L 63/02; C08L 63/00

[52] U.S. Cl. ............... 260/33.4 EP; 525/423; 525/113; 525/107; 528/88; 528/117; 528/407; 528/408

[58] Field of Search ......... 260/33.4 EP, 2 N, 47 EN, 260/830 TW, 830 P, 837 R

[56] References Cited

U.S. PATENT DOCUMENTS

| | | | |
|---|---|---|---|
| 3,011,909 | 12/1961 | Hart et al. | 260/33.4 EP |
| 3,356,645 | 12/1967 | Warren | 260/47 EN |
| 3,438,937 | 4/1969 | Christie | 260/830 TW |
| 3,867,385 | 2/1975 | Habermeier et al. | 260/33.4 EP |
| 3,878,146 | 4/1975 | Charlton | 260/33.4 EP |
| 3,896,082 | 7/1975 | Rensmann et al. | 260/47 EN |
| 3,907,731 | 9/1975 | Gardner | 260/33.4 EP |
| 3,954,650 | 5/1976 | Bliss | 260/33.4 EP |

OTHER PUBLICATIONS

Somerville et al., "Epoxy Resin Chem. & Tech.", Applied Polymer Science, Ed Graver, ACS Div. Org. Coating, 1975.

*Primary Examiner*—Herbert J. Lilling
*Attorney, Agent, or Firm*—Jean B. Mauro; J. Rodney Reck

[57] ABSTRACT

A curable system such as a curable adhesive type system having a relatively long pot life is disclosed. The curable system of the present invention comprises polymer containing material including at least one curable epoxy resin, at least one imidazole type catalytic curing agent for the resin and a solvent for the epoxy resin capable of suppressing or inhibiting the catalytic reaction between the resin and curing agent at least at about room temperature, the solvent being selected from methanol, ethanol and mixtures thereof.

6 Claims, No Drawings

CURABLE SYSTEMS CONTAINING EPOXY RESIN AND METHANOL OR ETHANOL SOLVENT TO SUPPRESS THE CATALYTIC REACTION BETWEEN EPOXY RESIN AND AN IMIDAZOLE CATALYTIC CURING AGENT

BACKGROUND OF THE INVENTION

The present invention relates to curable systems such as curable adhesive systems and is more particularly concerned with curable polymer containing systems having a relatively long pot life which comprise at least one curable epoxy resin and at least one imidazole type curing agent for the epoxy resin. Curable polymer containing systems find widespread utility as the applied starting material for producing coatings, fillings, linings, laminates, cores, encapsulants, adhesives and like on a variety of substrates.

The term "pot life" as used herein may be defined as the period of time a curable system is generally fit for its intended purpose under normal environmental conditions without special precautions. For most systems, these normal conditions are room temperature, humidity, etc. The pot life of a curable adhesive system is usually the period of time until gelation or hardening occurs, thereby making the system difficult or impossible to apply.

In a preferred embodiment of the present invention, the curable systems are adhesive type curable systems adaptable for joining two or more structures together in a semi-permanent or permanent manner. While the present invention will be primarily discussed hereinafter with reference to curable adhesive type systems, it should be understood that the invention is not thereby so limited.

In a continuous type manufacturing operation where articles are made by joining two or more structures with an adhesive bond formed from a curable adhesive system, it is generally preferably to utilize a curable adhesive system that will remain in the uncured state for an almost indefinite period before being applied to the structures to be joined, that is, have an almost indefinite pot life, will cure in a relatively short period of time without the application of harmful amounts of heat, and will still provide a strong adhesive bond.

One particular type of curable adhesive system which has been in widespread use is a system containing an epoxy resin alone or in combination with other type resins. Epoxy resins for these systems are polyethers generally composed of intermediate diepoxy compounds formed as the condensation product of epichlorohydrin and aromatic diols such as bisphenol A. These intermediate compounds may then be cured by a further cross-linking polymerization. The intermediate diepoxy compounds are usually soluble in organic type solvents which thereby facilitates application of these intermediates to various substrates. The term epoxy resin as used in this disclosure includes both the intermediate form and the final cross-linked form of the resin.

In many epoxy resin containing curable adhesive systems, a curing or cross-linking agent is included in the system so as to promote the rapid curing of the system once it has been applied to a substrate. Known curing agents for epoxy resins include imidazole compounds and various tertiary amines and amides such as dicyandiamide triethylene-tetramine. Other known curing agents include boron trifluoride and compounds having a reactive hydrogen atom such as organic acids, alcohols, mercaptans and primary and secondary amines.

However, the advantages obtained by the ability of the curing agent to promote curing of an adhesive system in a relatively short period of time must generally be balanced against the decreased pot life of the adhesive system due to presence of the curing agent unless the curing agent can in some fashion be inhibited or suppressed up to the time of application of the system. In many situations, the use of a particular curing agent in epoxy type adhesive systems has been thought to be generally precluded because of the relatively short pot life of the curable adhesive system.

For example, imidazole compounds have been known as effective catalytic curing agents for epoxy resins (see Imidazole Catalysis in the Curing of Epoxy Resins, A. Farkas and P. F. Strohm, *Journal of Applied Polymers*, Sci. Vol. 12 pp. 159–168 (1968)). The use of imidazole compounds as curing agents results in epoxy resins having excellent physical properties. However, the use imidizole type curing agents for epoxy resin containing adhesive systems has been limited as such systems have a very short pot life and thus their usefulness in continuous type manufacturing operations has been generally precluded.

SUMMARY OF THE INVENTION

It is therefore an object of the present invention to provide a curable system containing an epoxy resin and an imidozole type curing agent having a long pot life. Another object of the present invention is to provide a curable system containing epoxy resin and an imidazole type curing agent that is capable of being cured in a relatively short period of time. A further object of the present invention is to provide a curable adhesive system containing epoxy resin and an imidozole type curing agent, which upon curing results in an adhesive bond having excellent physical characteristics. Further objects, advantages and features of the present invention will become more fully apparent from a detailed consideration of the remainder of this disclosure and the appended claims.

Briefly, these objects are achieved by the present invention which, in its broadest aspects, relates to a curable system having a relatively long pot life comprising polymer material including at least one curable epoxy resin, at least one imidazole type catalytic curing agent for the resin and solvent for the resin capable of suppressing catalytic reaction between the resin and the curing agent at about room temperature selected from methanol, ethanol and mixtures thereof. The curable systems in accordance with the present invention find particular utility as curable adhesive systems as the systems have a relatively long pot life, a relatively short curing time and yield cured adhesives having good physical properties, especially tensile strength.

DETAILED DESCRIPTION OF THE PREFERRED EMBODIMENT

The present invention resulted from, among other things, the discovery that the inclusion of a solvent selected from methanol or ethanol, or mixtures thereof, in epoxy resin containing adhesive systems utilizing imidazole type catalytic curing agents greatly increases the pot life of such a system, in certain formulations even yielding a curable adhesive system having an almost indefinite pot life, while still providing an adhesive system that could be rapidly and easily cured. Although the use of methanol or other lower aliphatic alcohols as a solvent for epoxy resin - polyamide containing adhesive systems utilizing a curing agent selected from dicyandiamide, tri ethylenetetramine and an amine adduct of an epoxy resin have been known (for example, see the technical booklet *Structural Adhesives Based on DuPont ELVAMIDEφ8061 Nylon Resin,* DuPont Company, Wilmington Del., 1974), it was surprising that the use of a solvent selected from methanol and ethanol or mixtures thereof in an epoxy resin containing adhesive system tends to inhibit or suppress the catalytic reaction between the epoxy resin and an imidazole type curing agent incorporated therein. Generally, an imidazole type curing agent promotes such a rapid cross-linking of an epoxy resin that at room temperature the pot life of the epoxy resin containing adhesive system may be only about a day or less. In contrast, the epoxy resin containing adhesive systems of the present invention may have a pot life of at least two months or more at about room temperature.

As set forth previously, the curable systems of the present invention comprise polymer material including at least one curable epoxy resin, at least one imidazole type catalytic curing agent and a solvent selected from methonol, ethanol and mixtures thereof. The epoxy resins of the polymeric material of the system are generally the condensation of a product of epichlorohydrin and an aromatic diol. A preferred epoxy resin for systems of the present invention is the condensation product of epichlorohydrin and bisphenol A. The polymeric material may also include other resin materials depending upon the particular application for the system and the desired physical and chemical properties of the resultant product, provided such materials do not significantly interfere with the performance of the composition for its intended use. For systems to be used as adhesives, the inclusion of polyamide copolymers such as Elvamide 8061 nylon resin sold by DuPont Company, Wilmington, De., U.S.A. and reactive terminated acrylonitrile butadiene copolymers such as CTBN resin sold by the B.F. Goodrich Company, Akron, Ohio, U.S.A. may be advantageous.

The imidazole type curing agents utilized in the sytems of the present inventions are organic heterocyclic compounds containing a five-membered di-unsaturated ring with two nonadjacent nitrogen atoms as part of the ring. The imidazole curing agents are generally any which are capable of catalytically curing epoxy resins in bulk and are soluble in the solvents of this invention. Preferably, these imidazoles are described by the following formula:

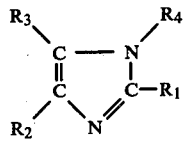

$R_1$, $R_2$, $R_3$ and $R_4$ are H or lower alkyl of 1–4 carbon atoms, alkaryl, or benzyl groups, optionally substituted. Preferably, either or both $R_2$ and $R_4$ will be hydrogen. Of course, substituents should not be selected so as to cause steric hindrance or other undesirable effects. Preferred imidazole type curing agents for the systems of the present invention include 2 - ethyl - 4 - methyl imidazole and 2 - methyl - imidazole, with the latter being the most preferred.

The inclusion of other materials in the curable systems of the present invention may also be advantageous, especially for adhesive type system. Methylene chloride or other chlorinated hydrocarbons such as trichloroethylene tend to help retain the polymeric material in solution and prevent crystallization while aiding the solution of the epoxy resin component. Curable systems according to the present invention may also contain various organic or inorganic filler materials, pigments, plasticizers, stabilizers and the like as are known in the art to modify the resultant properties of the cured system. Adhesion promoters such as reactive silanes may also be included.

Preferred curable adhesive systems in accordance with the present invention comprise about 4 to 40 wt % polymer material, about 0.1 to about 5% imidazole type curing agent, zero to about 20 wt % additives such as plasticizers, adhesion promoters, fillers and the like, and the remainder solvent which includes at least 25 wt % methanol, ethanol or mixtures thereof. The polymer material of the preferred systems includes at least 10 wt% curable epoxy resin. The most preferred curable adhesive systems in accordance with the present invention consist essentially of about 10 to about 25 wt % polymer material, about 0.2 to about 1 wt % additive or additives, and the remainder solvent which includes at least 33 wt % methanol, ethanol or mixtures thereof. The polymer material of the most preferred systems includes at least 15 wt % curable epoxy resin.

The apparent ability of the solvents methanol and ethanol and mixtures thereof to inhibit or suppress the catalytic reaction between epoxy resin and imidazole type curing agents contained in the systems of the present invention for almost indefinite periods at room temperature is not entirely understood. However, it appears that this ability is unique to these two alcohols and is not generic to all alcohols or even to other lower aliphatic alcohols as is indicated by the following examples. The examples also illustrate that curable adhesive systems in accordance with the present invention produce adhesive bonds of good physical characteristics. It should be understood that these examples are given for the purpose of illustration only and that the examples do not limit the invention as has heretofore been described.

EXAMPLE I

A number of curable systems are prepared with each system containing a diglycidal ether of bisphenol A type epoxy resin, a 2-methylimidazole curing agent, and a selected solvent or solvents. The weight ratio of epoxy resin to curing agent is about 20:1 and about 90 wt % of the system is solvent. After preparation of the systems a portion of each system is applied to a substrate, air dried until the solvent is essentially completely evaporated, and is subjected to a temperature of about 120° C. to determine the period of time necessary to cure the system. The remaining portion of each system in solution is then allowed to stand at room temperature to determine the length of time until hardening, gelation or precipitation of the system occurs, thus giving an indication of the pot life of each system. The solvent or solvents used in each system and the results relating to curing time and pot life are set forth below in tabular form:

tion of each system in parts by weight is set forth in the table below:

| Material | A | B | C | D | E | F |
|---|---|---|---|---|---|---|
| diglycidal ether of bisphenol A | 2 | 2 | 2 | 2 | 4.75 | 10 |
| polyamide copolymer | 10 | 10 | 10 | 10 | | |
| reactive terminated acrylonitrile butadiene copolymer | | | | | 0.25 | |
| high molecular weight epoxy resin | | | | | | 20 |
| anhydrous methanol | 45 | 45 | 45 | 45 | 15 | 45 |
| methylene chloride | 45 | 45 | 45 | 45 | 30 | 45 |
| n-2-amino ethyl-3-aminopropyl trimethoxy silane | | | | | 0.3 | |
| maleic anhydride | | | 0.3 | | | |
| pyromellatic dianhydride | | 0.6 | | | | |
| 2-methylimidazole | 0.2 | 0.2 | 0.2 | 0.2 | 0.24 | 1.0 |
| lap tensile in p.s.i. | 4700 | 5000 | 5000 | 5000 | 2500 | 2500 |

The diglycidal ether of bisphenol A is a resin sold under the tradename DER 331 by Dow Chemical Company of Midland, Michigan, the polyamide copolymer is a 6-12 nylon copolymer sold under the tradename Elvamide 8061 by the DuPont Company, the acrylonitrile butadiene copolymer sold under the tradename CTBN by B.F. Goodrich Corp., the epoxy resin sold under the tradename Epon 872 by Shell Chemical Co., of New York, N.Y.

Adhesive systems A through D are applied to steel lap strips, in a thin film by dipping or coating, and are allowed to air dry until the solvent has evaporated essentially completely. A polyamide sheet blank 0.125-inch thick is then clamped between the steel strips to form lap shear tensile specimens. The adhesive systems are cured by heating to a temperature of about 210° C. for about 8 minutes. Adhesive systems E and F are applied to a steel lap and then cured at about 120° C. for about 10 minutes. The tensile strength of each system is shown in the above table. As indicated, adhesive systems according to the present invention which cure at a relative rapid rate when exposed to elevated temperature produce adhesive bonds of good physical strength.

While the present invention has been described with reference to particular embodiments thereof, it will be understood that numerous modifications may be made by those skilled in the art without actually departing from the spirit and scope of the invention as defined in the appended claims.

| Solvent | Cure time (min) | Pot Life (days) |
|---|---|---|
| methanol/CH$_2$Cl$_2$ (1:1) | 10 | * |
| ethanol | 10-15 | * |
| n-butanol | 10 | 7 |
| isopropanol | 10 | 4 |
| tert butyl alcohol | 5-10 | 7 |
| toluene | 5-10 | 40 |
| benzene | 5-10 | 40 |
| acetone | 10-15 | 40 |
| methyl ethyl ketone | 10-15 | 33 |
| tert butyl alcohol/ CH$_2$Cl$_2$ (1:1) | 10 | 30 |

*No gelation or hardening after 60 days.

As the above table indicates, the systems containing either methanol or ethanol as at least a portion of the solvent have a cure time of approximately the same as the other systems and have an almost indefinite pot life. In contrast, the systems containing other solvents not in accordance with the present invention have a pot life of at most about 40 days. Of significance is that the systems utilizing other aliphatic alcohols as part of the solvent for the system have a relatively short pot life, about seven days or less.

EXAMPLE II

A number of curable systems very similar to those of Example I are prepared, the only difference being the amount of solvent used is about 70 wt % of the total system. Each system is tested as in Example I, the results being as shown in the following table:

| Solvent | Cure Time (min) | Pot Life (days) |
|---|---|---|
| methanol/CH$_2$Cl$_2$ (1:1) | 10 | * |
| ethanol | 5 | * |
| n-butanol | 10 | 6 |
| isopropanol | 5 | 3 |
| tert butyl alcohol | 5 | 3 |
| toluene | 5 | 10 |
| benzene | 5 | 10 |
| acetone | 10 | 17 |
| methyl ethyl ketone | 10 | 17 |
| tert butyl alcohol/ CH$_2$Cl$_2$ (1:1) | 5-10 | 9 |

Again, as was illustrated in Example I, the systems utilizing methenol or ethanol as at least a portion of the solvent in accordance with the present invention have an almost indefinite pot life while systems containing the other solvents listed including other aliphatic alcohols have a pot life of only about 17 days or less.

EXAMPLE III

A number of curable adhesive systems in accordance with the present invention are prepared, cured and tested for resultant physical properties. The composi-

I claim:

1. A curable adhesive having a relatively long pot life comprising polymer material including at least one curable epoxy resin, at least one imidazole catalytic curing agent for the resin, and solvent for the resin capable of suppressing catalytic reaction between the resin and the curing agent at least at about room temperature, said solvent being selected from the group consisting of methanol, ethanol and mixtures thereof.

2. A curable adhesive according to claim 1 wherein the polymer material includes polyamide.

3. A curable adhesive according to claim 1 wherein the catalytic curing agent is 2-methylimidazole.

4. A curable adhesive according to claim 1 wherein the polymer material further includes a material selected from the group consisting of polyamide copolymers, reactive terminated acrylonitrile butadiene copolymers and mixtures thereof.

5. A curable adhesive according to claim 1 wherein the solvent is methanol and the system further includes methylene chloride.

6. A curable system according to claim 1 wherein the polymer material includes a diglycidal ether of bisphenol A epoxy resin.

* * * * *

UNITED STATES PATENT OFFICE
CERTIFICATE OF CORRECTION

Patent No.  4,159,976    Dated  July 3, 1979

Inventor(s)  James P. Moran, Jr.

It is certified that error appears in the above-identified patent and that said Letters Patent are hereby corrected as shown below:

At Column 5, Line 58:  Add the notation below the table,

* No hardening or gelation after 60 days.

At Column 6, Line 64:  Delete the word "system" and add "adhesive."

At Column 6, Line 66:  Delete the word "system" and add "adhesive."

Signed and Sealed this

Twenty-first Day of September 1982

[SEAL]

Attest:

Attesting Officer

GERALD J. MOSSINGHOFF

Commissioner of Patents and Trademarks